United States Patent Office 3,619,995
Patented Nov. 16, 1971

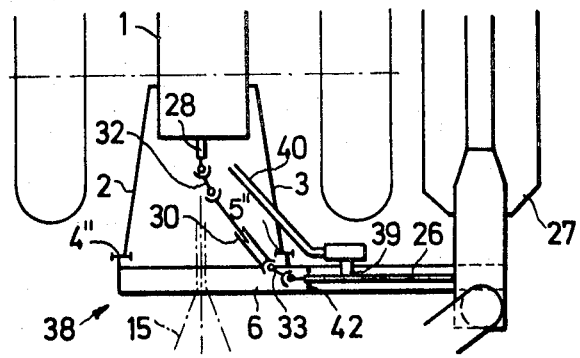
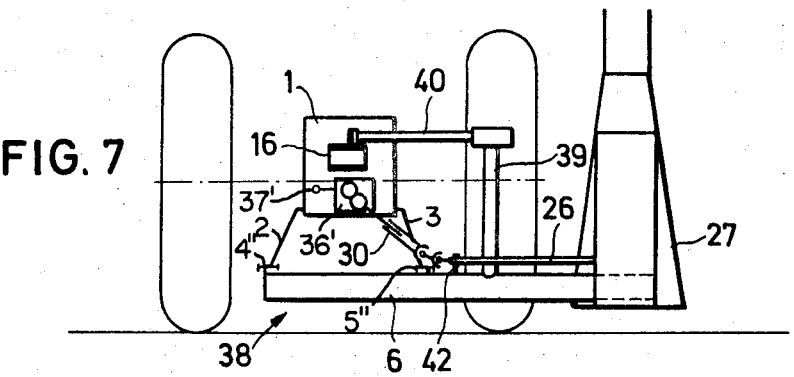
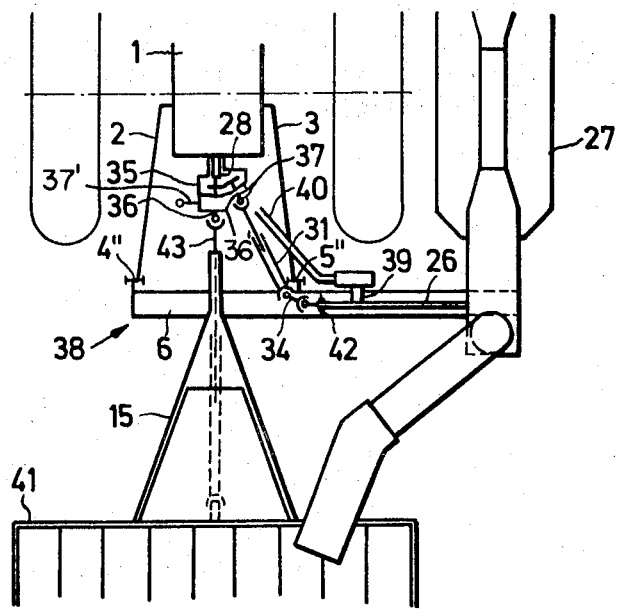

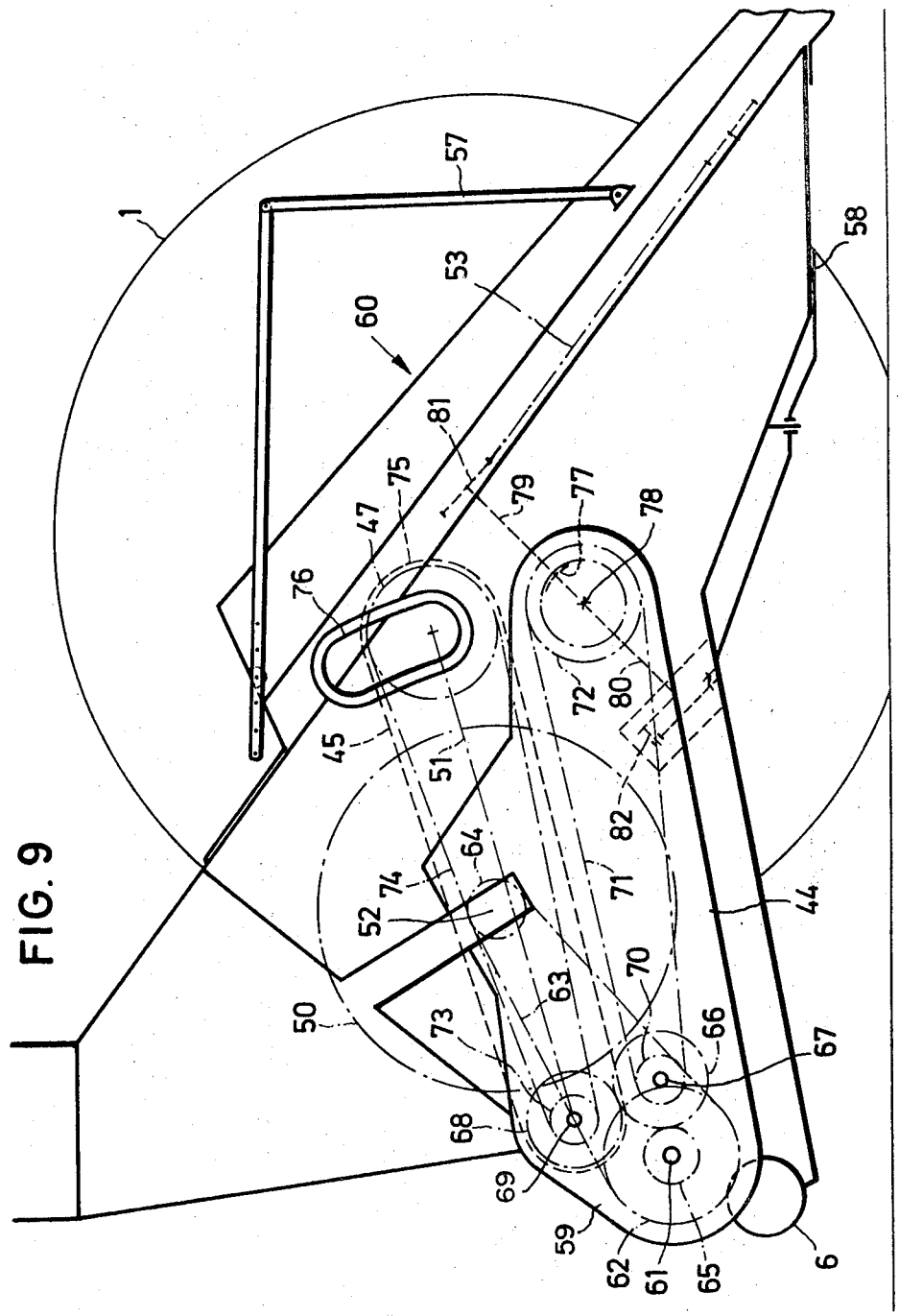

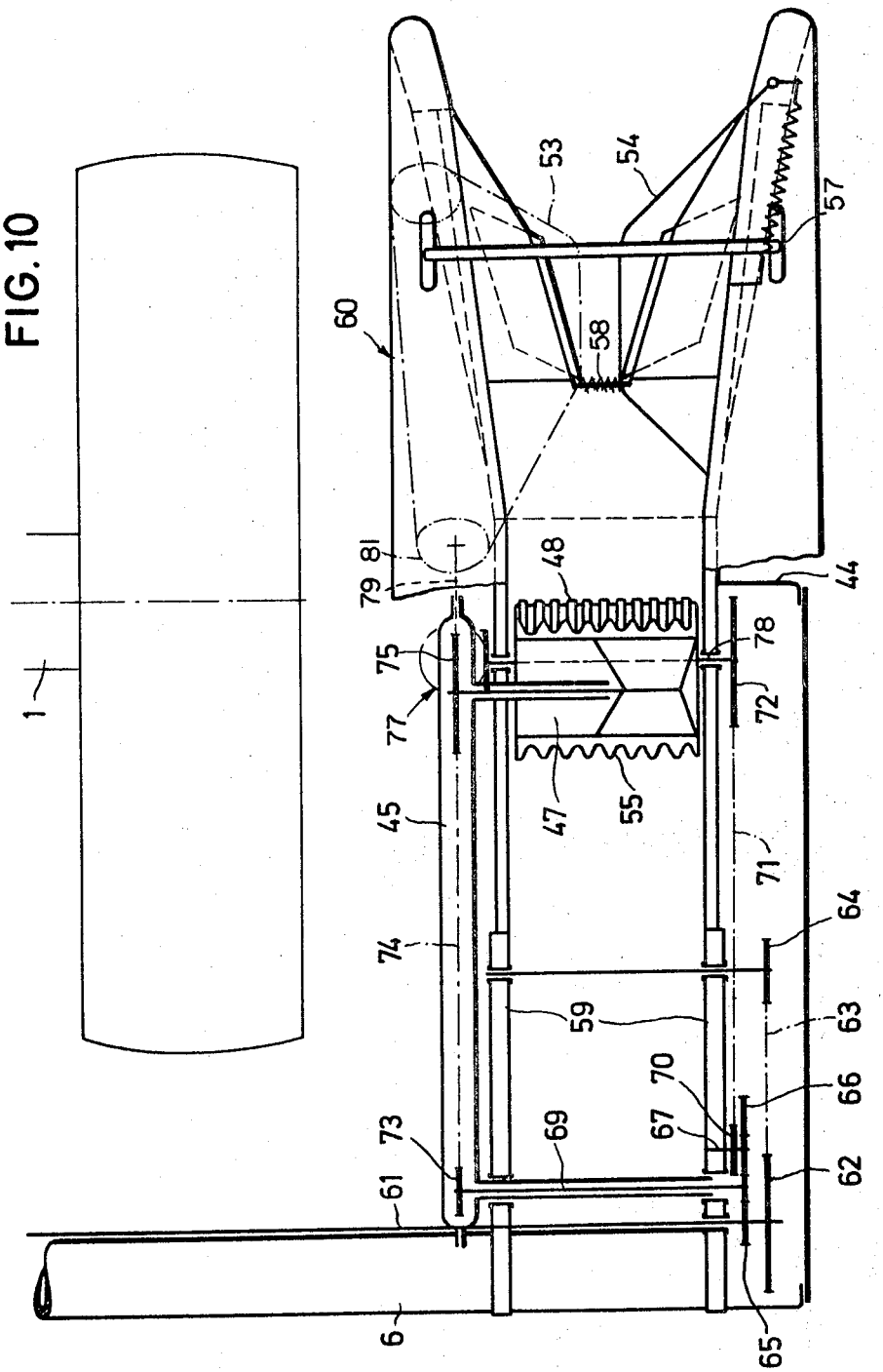

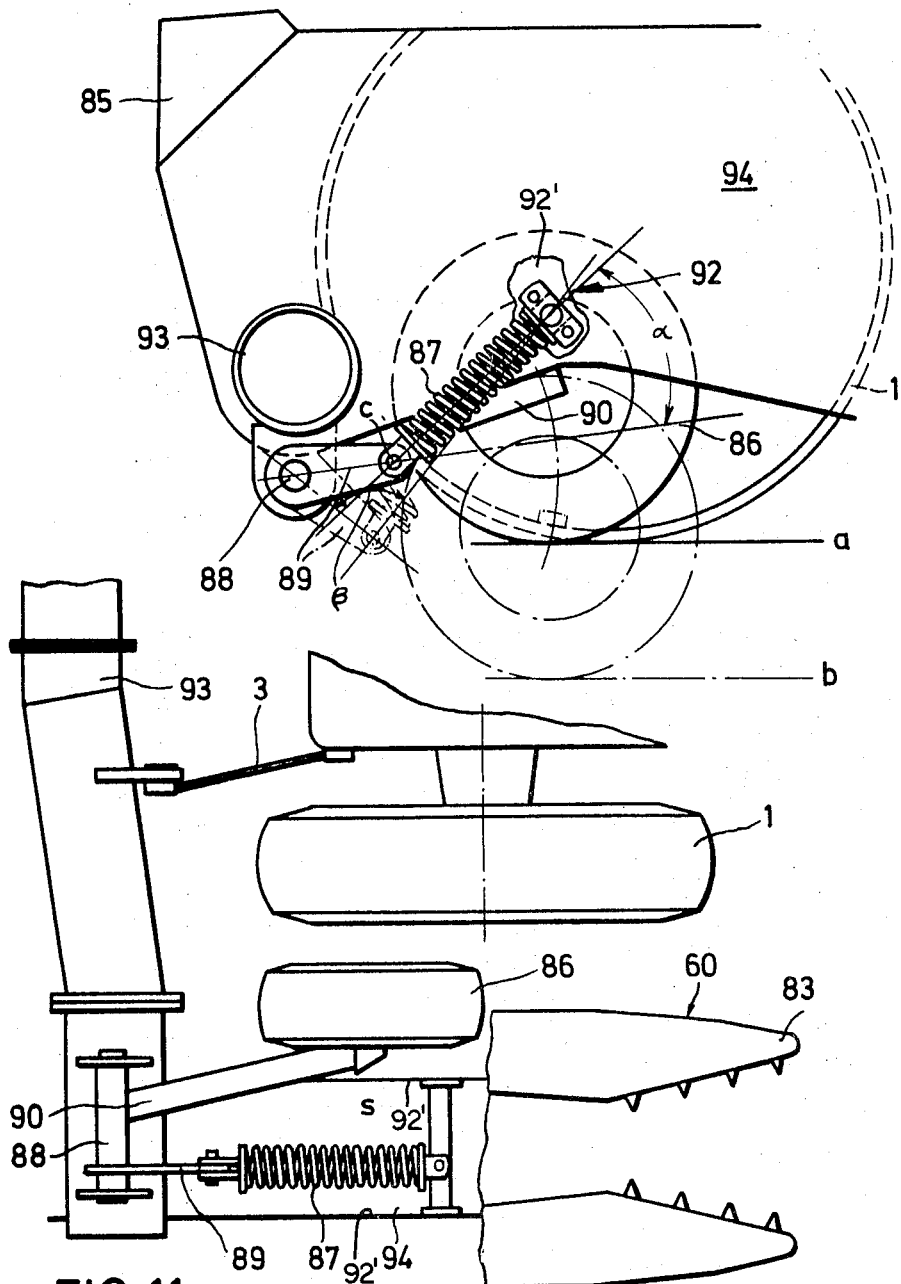

3,619,995
APPARATUS CONNECTIBLE TO A TRACTOR OR AGRICULTURAL VEHICLE
Alfred Eggenmuller, Ulm, Lorenz Scherer, Oberelchingen, Heinrich Bellan, Thalfingen, and Rudolf Wöhrle, Rieden, Germany, assignors to Gebruder Eberhardt, Ulm (Danube), Germany
Filed July 10, 1969, Ser. No. 840,692
Claims priority, application Germany, July 11, 1968, P 17 82 045.0; Sept. 28, 1968, P 17 82 656.1; Jan. 21, 1969, P 19 02 761.8; Apr. 3, 969, P 19 17 307.0
Int. Cl. A01d 45/02, 49/00
U.S. Cl. 56—13.4
7 Claims

ABSTRACT OF THE DISCLOSURE

Lifting means applicable to a tractor having a three-point hydraulic lift mechanism and applicable to a tool adapted for operation alongside of the tractor, such as a corn picker, binder or mower. It is particularly adaptable to tools having a relatively long extent in the direction of movement of the tractor, such as a corn picker. The mechanism lifts the tool at such a point in relation to the center of gravity of the tool that the weight of the tool assists in maintaining same when lifted in a position approximately parallel with the ground. Snubbing and auxiliary support mechanism are provided for use if desired to assist further in support and guidance of the tool.

---

The invention relates to an apparatus, or tool, which is connectible to a tractor or agricultural vehicle. This apparatus has a connecting device consisting of a crossarm connectible to the lower guide rods of the tractor three-point linkage with an end of said crossarm extending beyound the tractor width and an apparatus operating laterally beside the tractor being secured to said end.

Furthermore, the apparatus has a drive mechanism for driving a harvesting machine of the type which operates laterally beside the tractor, such as reapers, mowers or the like, which are connectible to the tractor three-point linkage through a frame which leaves open and available for the engagement of a wagon the normal drawbar zone directly behind the tractor.

This harvester has a receiving mechanism for the cut stalks, in particular for corn, and a stalk chopping mechanism following said receiving mechanism with feeding, cutting and expelling means.

The tool which is connected to a tractor or agricultural vehicle which is in particular secured laterally by means of a support arm can be lowered into an operating position close to the ground and can be raised for transport by the tractor hydraulic equipment or any other type of winch.

In conveying devices, in particular for harvesting machines which convey the harvested products onto a wagon, there exists the demand that the tractor pulling zone remain accessible even where there exists on the tractor permanent apparatus for the engagement of the wagon shaft. A connecting frame is already known for harvesting machines which operate laterally beside the tractor, which connecting frame is connected to the three guide rods of the tractor three-point linkage and is constructed in such a manner that the tractor pulling zone is open to permit the engagement of a harvesting wagon. This connecting frame consists of a crossarm on which are provided the mounting bolts for the lower guide rods and which extends to one side beyond the tractor width at the end of which arm the harvesting machine is secured. In the zone of the mounting bolts for the lower lift rods two bars are mounted to the crossarm and extend upwardly and forwardly. A U-shaped clamp which forms the upper lift rod is pivoted to the upper end of the bars, said clamp being connected to the tractor through a bearing eye. The bars and the clamp-shaped guide rod are thereby directed forwardly toward the tractor in such a manner that they guide around the pulling zone of the tractor so that same remains open for the engagement of a wagon.

During the lifting of the apparatus, the upper lift rod which is connected to the bars assures that the apparatus lifted by the lower lift rods cannot tilt forwardly but is also lifted off the ground with the forward part of the harvesting machine as parallel as possible.

This surprisingly simple construction which established an entirely new manner of connection can, however, be used only to a limited extent because the two bars which form the couple for the connection of the upper lift rod severely limits the zone of swing of the shaft of the wagon, so that during the negotiation of narrow curves, the wagon shaft encounters one of the bars.

In recognizing these disadvantages, it has been suggested for a field harvester with a series arranged cutting mechanism operating laterally beside the tractor that one might connect the apparatus at the rear through a cross-arm only to the lower lift rods of the three-point linkage and adjust the apparatus with respect to the lower lift rods in such a manner that it cannot tilt forwardly about the pivot points on the side on the appartus during the lifting operation. This, in turn, has the disadvantage that in the case of apparatus extending far forwardly, like for example as is the case with a harvester having a series cutting mechanism, the apparatus is only lifted at its rear end while, depending on the position of the apex of the linkage, the front end moves even deeper instead of raising up. Thus, this type of connection is not usable for most agricultural apparatus.

Regarding the drive mechanism, in one presently known harvester which operates laterally beside the tractor, and has a series cutting mechanism for corn, the connecting frame which is connectible to the three-point linkage has a hollow support extending beyond the tractor width. The harvester is secured to the end of said hollow support. A bevel gearing is arranged on the hollow support in the zone of the tractor power-takeoff shaft, a shaft supported in the hollow support leading to the harvester from said bevel gearing. Thus, in addition to a common drive shaft, a bevel gearing and a further drive transmitting shaft are required for driving the harvester.

Furthermore, in the known harvester with a series cutting mechanism for corn or the like, the several members of the receiving mechanism and the cutting mechanism are driven through gears, chain drives, drive shafts and the like by a main shaft which is driven by the power-takeoff shaft of the tractor.

Thus, many drive transmitting means are required which are arranged on both sides of the stalk chopper housing on its sidewalls. These drives are positioned completely freely and open so that at any time the dust, dirt and even foreign bodies, which dust is heavy during agricultural operations, can penetrate into the gearing and can settle therein. This leads to a premature wearing of the several drives and often to trouble which results in longer interruptions of the operation. It has already been suggested to receive the individual drives in an oil-filled housing. This has, however, so far been limited to the gearing, while the chain drives remain open, often without any protective housing. Since, as this is known, in chain drives not only the bearings of the sprockets but also the chains themselves are lubricated, dirt and dust settle particularly thickly and result, in particular after interruptions in use, to incrustations which can only be removed with difficulty and with expenditure of much time. Furthermore, attention must always be paid to assure correct lubrication for the chain drives which is often inconvenient and thus open gearing frequently breaks down early because of an insufficient or irregular lubrication and causes an undesired, mostly unpredictable, interruption during harvesting.

Furthermore, a harvester operating beside the tractor is already known, wherein the harvester is connected through a support arm which contains also the drive shaft to the three-point hydraulic unit of the tractor and is guided laterally beside the rear wheel of the tractor. With connecting apparatus which is constructed narrowly, it is possible to drive on public roads. The apparatus is lifted in transporting position. This manner of connection is, however, only suitable for heavy tractors. In the case of lighter tractors, the weight of the connecting apparatus may load the rear wheels of the tractor beyond the permissible limit, for example, in the case of sudden acceleration or deceleration.

It is the purpose of the invention to first construct a device which permits connection of a tool operating laterally beside the tractor through a crossarm only to the lower lift rods of the tractor, in which, however, during lifting the tool is lifted off the ground with its front and rear ends evenly, namely parallel or at least approximately parallel with the ground.

A further purpose of the invention is to simplify the drive of a harvesting machine operating laterally beside the tractor and to construct same in such a manner that a drive shaft is effective for transmitting the drive from the tractor power-takeoff shaft to the harvesting machine.

A further purpose of the invention is to construct a harvesting machine of the above-mentioned type in such a manner that the above-mentioned disadvantages are substantially avoided.

According to a further purpose of the invention, the liftable and lowerable apparatus for lifting and lowering the tool will not load the tractor beyond the permissible limits.

Regarding the connecting device, the purpose of the invention is attained in such a manner that the mounting bolts which are used for the connection to the lower lift rods are staggered on the crossarm so that an extension line drawn through the mounting bolts extends, seen in direction of driving, in front of the center of gravity of the apparatus. Through this, in a particularly simple manner the center of gravity of the apparatus is used for lifting the front end of the apparatus, since the apparatus, due to the position of its center of gravity behind the connecting line, tilts backwardly automatically on the mounting bolts of the lifting means.

According to a preferred embodiment of the invention, an arm which, seen in direction of driving, extends forwardly and supports a mounting bolt is provided on the crossarm and a bearing is arranged on one of the lower lift rods, said bearing receiving the mounting bolt. In this manner, it is possible to use for the mounting the usual lower lift rods of the three-point linkage provided on the tractor.

According to a further advantageous embodiment of the invention it is also possible to achieve the same effect by arranging between the crossarm of the apparatus and at least one of the lower lift rods, a spring acting about the pivot points against the rotational moment of the center of gravity of the apparatus. Thus, during the lifting operation, the apparatus is pivoted rearwardly by the spring about the mounting bolts and thus the front end of the apparatus is lifted off the ground.

According to a further characteristic of the invention, the free pivoting movement of the apparatus about the mounting bolts is limited by stops or, alternatively, the pivoting zone is adjustable. By limiting the pivoting movement of the apparatus the advantages are obtained, first, that during the lifting operation the apparatus tilts rearwardly only so far as this is required to provide a lift clearance sufficient for desired transporting and second that during the operation the front end of the apparatus is guided at the proper distance above the ground.

Finally, according to a further characteristic of the invention, a support wheel or the like which is adjustable in height is provided on the crossarm or on the apparatus behind its center of gravity, by which the apparatus is adjustable into the desired operating position.

The drive mechanism is according to the invention constructed in such a manner that the drive rod on the harvesting machine is positioned in a top view at an angle of >60° to the tractor power-takeoff shaft and the machine is driven by means of a conventional drive shaft with at least one wide angle joint. Thus, in the case when the drive rod on the harvesting machine is positioned in a top view at an angle of approximately 90° to the tractor power-takeoff shaft, only a drive shaft with two wide angle joints is needed. Thus, the drive is transmitted from the tractor power-takeoff shaft without the interposition of any kind of gearing parts directly to the machine which is positioned laterally beside the tractor.

In order to be able to drive in addition to the harvesting machine, if desired, also simultaneously the raking floor of a harvesting wagon connected to the tractor pulling zone, according to a further embodiment of the invention a removable gearing is provided on the tractor power-takeoff shaft, which removable gearing is constructed as a bevel gearing with two driven shafts, one driven shaft of which is directed slopingly to the harvesting machine, and the machine is driven by means of a conventional drive shaft with a wide angle joint, while the other driven shaft is directed to the drive means on the harvesting wagon which is drivable through a common drive shaft.

In order to adjust the removable gearing for the different position of the power-takeoff shaft on various tractors and the different position of the drive rod on the single harvesting machines and to thereby maintain the angle of inclination of the drive shafts as small as possible, according to a further characteristic of the invention the bevel gearing is adjustable and fixable about the axis of the power-takeoff shaft.

Finally, according to a further characteristic of the invention, the driven shafts can be alternately connected, with one shifting lever each or with a common shifting lever, which is of an advantage during both the loading and during the unloading of the harvest wagon on the farm.

Regarding the harvester, the purpose is attained according to the invention in such a manner that all drive elements of the receiving mechanism and of the stalk chopping mechanism are arranged in closed oil-filled housings, whereby the drive elements which move relative to the stalk chopping mechanism are mounted in a separate housing which is movable with respect to the chopper housing.

It is advantageous if the movable, separate drives in the harvester, for example, the drive for the upper feed roller, are arranged on the other side and thereby according to a characteristic of the invention, the pivot point around which the upper feed roller operates is positioned on the side of the chopping drum opposite the press members. The position of the pivot point is thereby the most favorable one when the connecting line from the pivot point to the feed roller passes in the central position through the axis of the chopping drum.

Furthermore, the invention refers to still further preferred embodiments of the harvester which make the arrangement of the drives in oil-filled housings feasible.

Thus, the harvester of the type described above has as a feed member only one single feed chain (which cooperates with a pressure means opposite said feed chain, for example, a clamp or rollers), while the stalk choppers known so far are provided with four feed chains where, of course, also four drive transmitting means are needed.

A further characteristic is that the press members are formed by an upper movable feed or press roller which is provided with catches and a lower rigid ribbed roller, while the known stalk choppers have mostly four or at least three rollers. For the functioning of a harvester constructed according to the above characteristics, it is advantageous if the clamp gripping the plants is positioned in front of the cutting blade so that the plants are gripped by the feed chain and are safely fed with the cutoff end first to the stalk chopper.

The operating device is within the purpose of the invention supported, both during operation and during transport, on a resiliently suspended wheel, whereby the spring has associated therewith means for adjusting the support force to a valve which is approximately the same in both positions.

The latter is achieved according to the invention automatically in such a manner that the support wheel is held on a bottom arm of a bell crank which at its apex is supported pivotably on the operating device or the support arm, the spring engaging directly or indirectly the upper arm of the bell crank in such a manner that its direction of action defines at the point of engagement, in the position in which the spring bias is less, approximately a right angle and, in the position in which the spring bias s greater, approximately an obtuse angle with the axis of the arm.

A coil spring can thereby be provided as a spring, said coil spring responding to pressure in axial direction and being arranged in reference to the lever arm in such a manner that its axis and the lever arm define in both positions at the point of engagement an angle of approximately 30–90°.

According to the invention, the bell crank is constructed in an advantageous manner so that it two arms are positioned at an obtuse angle to one another and are arranged side by side on a pin of a pivot bearing in such a manner that the top arm is positioned on the inside and guides the support wheel between the operating device and the tractor wheel and the bottom arm is positioned underneath the apparatus housing in which at least the spring suspension is arranged.

The invention will be described more in detail in connection with the exemplary embodiments illustrated in the drawings, in which:

FIG. 6 is a top view of a drive mechanism in a schematical illustration;

FIG. 7 is a rear view of FIG. 6;

FIG. 8 is a top view of a modified exemplary embodiment of a drive mechanism in a schematic illustration;

FIG. 9 is a side-elevational view of a harvester in a schematic illustration;

FIG. 10 is a top view of the harvester;

FIG. 11 is a top view of a laterally connectible tool;

FIG. 12 is a partial side-elevational view of the device of FIG. 11.

Figure 1:
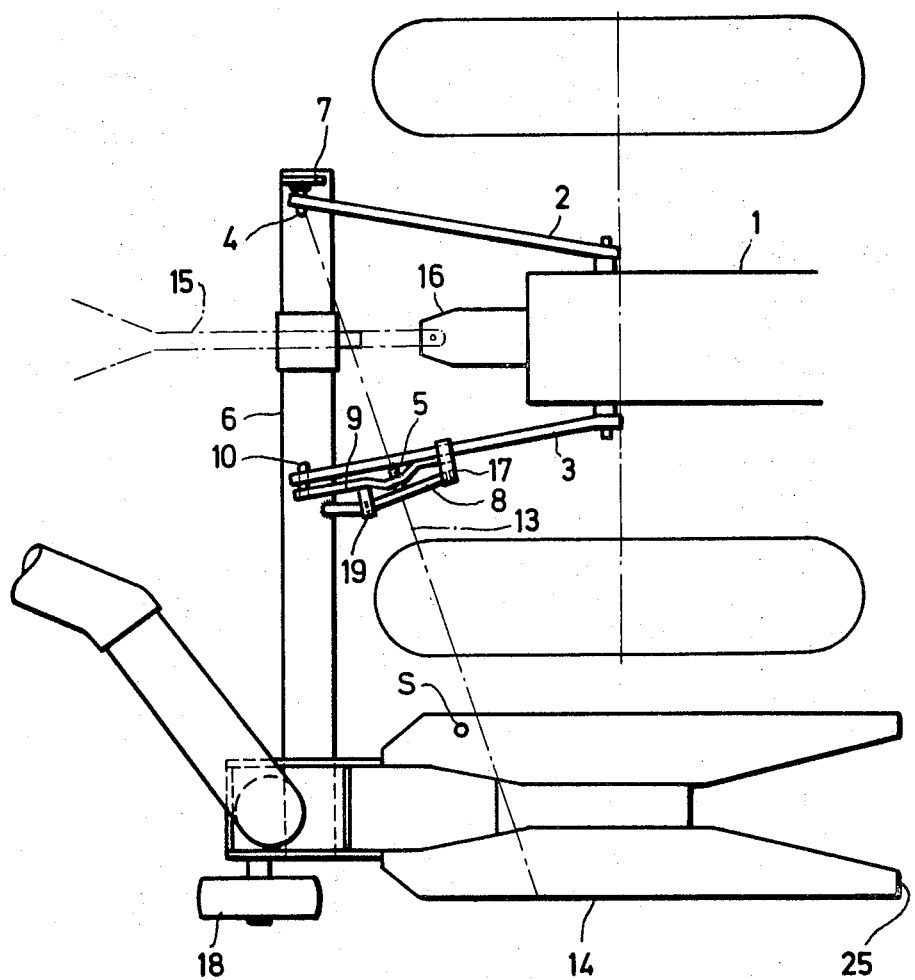
FIG. 1 is a top view of a tool connected to a tractor by the device of the invention.

A crossarm 6 is pivoted by mounting bolts 4, 5 to the lower lift rods 2, 3 of a common three-point linkage of a tractor 1. The mounting bolt 4 is thereby secured as commonly known through a flange 7 to the crossarm 6, while the other mounting bolt 5 is connected to the crossarm 6 through a forwardly extending support 8. A support 9 which receives the mounting bolt 5 is arranged on the lift rod 3, with one end being connected to the rear apertured end of the lift rod 3 by means of a bolt 10 and on the other end is clamped on the lift rod 3 by means of a screw 12. Thus, the support 9 is rigidly connected to the lift rod 3 so that the crossarm 6 is freely pivotable about the extension line 13 drawn through the two mounting bolts 4, 5.

The crossarm 6 extends beyond the width of the tractor and supports at its outer end an agricultural implement or tool 14, for example a corn cutter as illustrated in the drawings, which extends substantially in a narrow, elongated type of construction from the cross arm 6 forwardly in longitudinal direction of the tractor. Thus, the apparatus 14 with the crossarm 6 is pivoted at the rear end only to the lower lift rods 2, 3 so that the space required for connecting a wagon shaft 15 of a trailer which at the tractor drawbar 16 is completely open, namely is not blocked by the upper lift rod of the tractor's three-point linkage. The mounting bolt 5 is moved forwardly in comparison to the mounting bolt 4 so far that the extension line 13 drawn through the two mounting bolts 4, 5 extends in front of the center of gravity S of the apparatus 14. Through this, the tool 14 tilts rearwardly as soon as it is lifted off from the ground about the mounting bolts 4, 5, whereupon the point 25 of the tool 14 swings upwardly. To limit this swinging movement, the forward end of the support 8 is constructed as a stop 17 which cooperates with a counterstop 11 which is provided on the support 9. The stop 11 can, for example, be formed by an adjusting screw through which the lifting height of the point 25 of the tool is adjustable as needed. During the lowering of the apparatus 14 from the transporting position into the operating position, first a support wheel 18 which is arranged at the rear end of the apparatus 14 hits the ground so that the apparatus again tilts forwardly until the support 8 abuts a counterstop 19 arranged on the support 9. The stop 19 is also advantageously constructed as an adjusting screw so that the required operational height of the point 25 of the tool can be adjusted above the ground. The rear end of the apparatus can be regulated in height by the height-adjustable support wheel 18. In order to prevent a pivoting of the apparatus 14 about the pivot points of the bolts 4, 5 during transporting of the tool, a locking mechanism which is not further illustrated in the drawings can, if needed, be provided.

Figure 2:
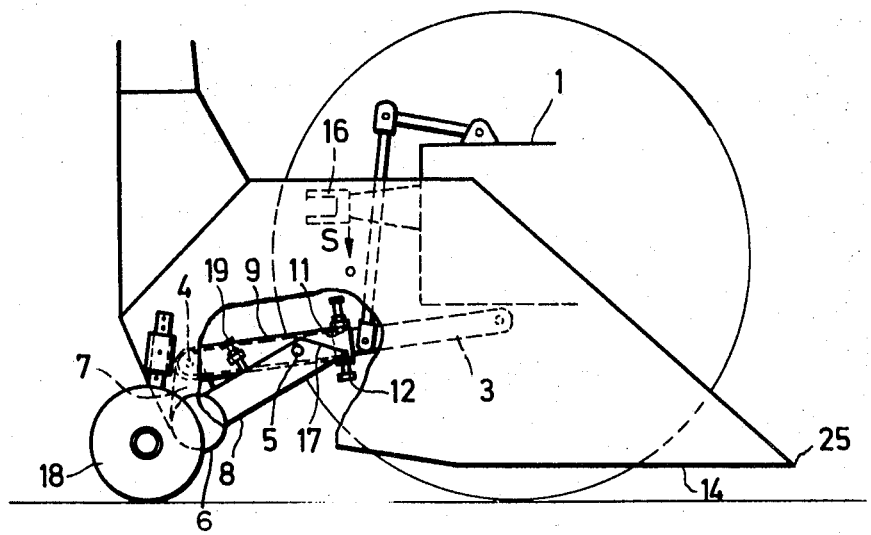
FIG. 2 is a side-elevational view of the device, wherein the tool is in operating position.
Figure 3:
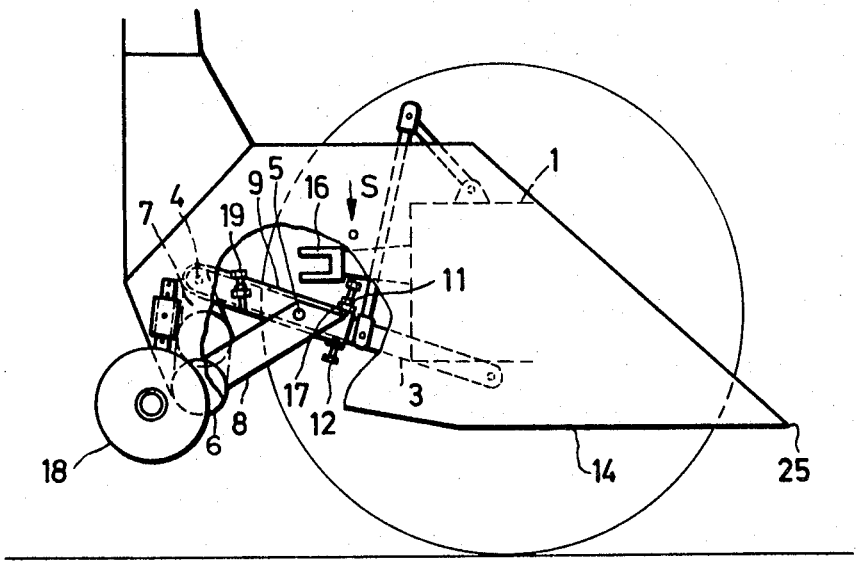
FIG. 3 illustrates the device with the tool raised.
Figure 4:
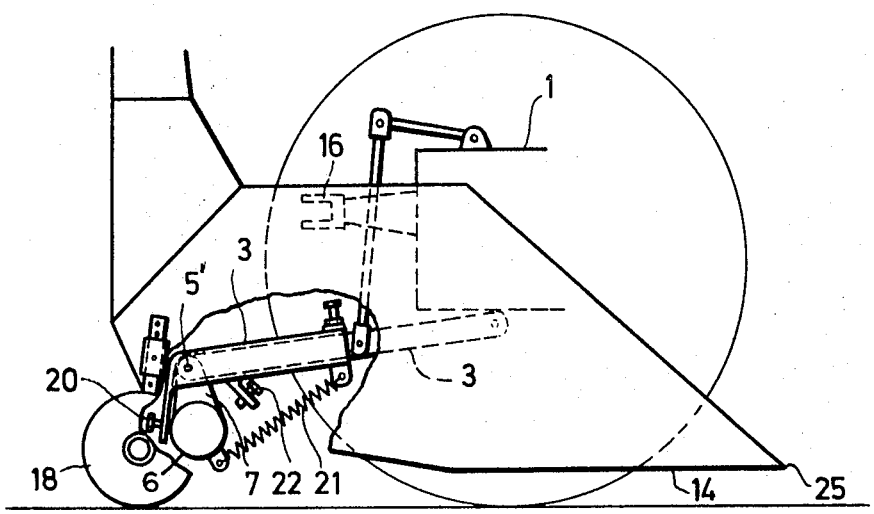
FIG. 4 illustrates a further embodiment of the device with a tool in operating position.
Figure 5:
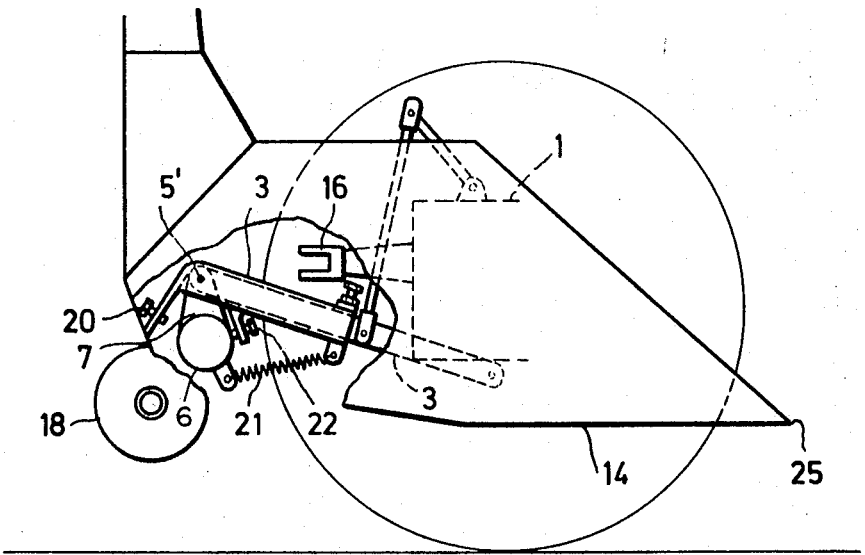
FIG. 5 illustrates the device according to FIG. 4 with the tool raised.

In the exemplary embodiment of FIGS. 4 and 5, the mounting bolts, only one 5' of which is shown as is commonly done, are arranged directly on the crossarm 6 so that the crossarm 6 and thus the apparatus 14 can be connected to the apertured ends of the lower lift rods 2 and 3. During operation, the apparatus 14 is supported, as in the embodiment of FIGS. 1 to 3, on the support wheel 18. The position of the point 25 of the apparatus above the ground is adjusted by means of a stop 20 constructed as an adjusting screw, which stop 20 illustrates at the same time the swinging limitation in the operating position.

In order for the point 25 of the apparatus to be raised from the ground during the lifting operation, a spring 21 acting against the center of gravity S of the apparatus is arranged between the crossarm 6 and one of the lift rods 2 or 3. The spring 21 is arranged and dimensioned in such a manner that the apparatus 14, as soon as it is lifted off the ground, pivots in response to said spring rearwardly about the mounting bolts, only one 5' of which is shown in FIGS. 4 and 5. For the limitation of swing in the case of the lifted apparatus, namely during transportation thereof, an adjusting screw 22 is provided on the lift rod 3 or 2, which adjusting screw 22 cooperates with the crossarm 6.

A harvester 27 which is connected to the three-point linkage of the tractor 1 through a connecting frame 38 was chosen for the exemplary embodiment illustrated in FIGS. 6, 7, 8. The connecting frame 38 comprises a crossarm 6 which has two mounting bolts 4", 5" for the connection to the lower lift rods 2, 3 and a frame member 39 which is positioned outside the mounting bolts for the connection to the upper lift rod 40 of the three-point linkage. The frame member 39 is placed well to the outside so that the tongue 15 of the harvesting wagon 41, which tongue is connected to the drawbar 16, can swing sufficiently far to the side.

The harvesting machine 27 has a drive shaft 26 which is directed perpendicularly to the operating direction and which can, if necessary, be supported additionally in a bearing 42 on the crossarm 6. The harvesting machine 27 is driven by the tractor takeoff shaft 28 through a drive shaft 30 with two wide-angle joints 32, 33.

In the modified exemplary embodiment of FIG. 8, there is provided a removable gearing 35 on the tractor power-takeoff shaft 28. The removable gearing 35 which is constructed as a bevel gearing has two driven shafts 36 and 37, the rearwardly directed driven shaft 36 of which drives the raking bottom of the harvesting wagon 41 through a drive shaft 43. The driven shaft 37 is directed angularly to the harvesting machine and drives the drive shaft 26 and thus the harvesting machine 27 through a drive shaft 31 with a wide-angle joint 34. The removable gearing 35 can be pivoted about the power-takeoff shaft 28 in order to align the driven shaft 37 in an elevated position favorable for the harvesting machine 27 and to thus maintain the reference angle of the drive shaft 31 as small as possible.

The driven shafts 36 and 37 can be activated or deactivated alternately through a conventional shifting clutch 36' and shifting lever 37'.

The harvester according to FIGS. 9 and 10, comprises a chaff chopping housing 59 and a cutting machine 60 for crops grown in rows which is connected to the chaff chopping housing to form a unit therewith. Same is connected to the three-point linkage of the tractor 1 through a crossarm 6. The drawing illustrates only the right rear wheel of the tractor 1.

The chaff or stalk chopper is driven in any known manner by the tractor power-takeoff shaft through a drive shaft such as drive shaft 26, which is not further illustrated and which leads to a shaft 61 supported in the chaff chopper housing 59. A sprocket 62 is arranged on the shaft 61, which sprocket 62 drives the sprocket 64 of the chopping drum 50 through a chain 63. The sprocket 64 is constructed in a presently known manner as an idler or driven sprocket which permits a forward running of the chopping drum 50. Furthermore, a gear 65 is arranged on the shaft 61, which gear 65 drives a gear 66 of a countershaft 67. The gear 66 drives a shaft 69 through a gear 68, which shaft 69 is supported behind the chopping drum 50 in the chaff chopping housing 59. Further, a sprocket 70 which is connected to the gear 66 is arranged on the countershaft 67, said sprocket 70 drives the lower ribbed feed roller 48 through a chain 71 and a sprocket 72. The drive means 62, 63, 64; 65, 66; 68 and 70, 71, 72 are all arranged together in a closed oil-filled housing 44.

A sprocket 73 is arranged on the other side of the chaff chopper housing 59 on the projecting end of the shaft 69, which sprocket 73 drives through a chain 74 and a sprocket 75 the upper feed or press roller 47 which is provided with ribs 55. The drive means 73, 74, 75 are arranged in a separate closed oil-filled housing 45. Since the press roller 47 must be movable corresponding to the guide slot 76, the housing 45 is also movable with the drive means arranged therein and can pivot about the shaft 69. The pivot point 46 is positioned so that in a central position of the roller 47, the connecting line 51 from the pivot point 46 to the roller 47 passes through the chopping drum axis 52. The housing 45 is constructed of a correspondingly strong sheet metal and is used at the same time as a pivotable support for the upper roller 47. A bevel gearing 77 (FIG. 9) is secured to the chaff or stalk chopper housing 59, which bevel gearing is driven by the shaft 78 of the lower feed roller 48.

Two shaft ends 79 and 80 project out of the housing for the bevel gearing 77, the shaft 79 supporting a drive sprocket 81 for the feed chain 53 and the shaft end 80 supporting a crank 82 for the cutting blade drive of the cutting mechanism 60. A guide 54 is arranged in spaced relation to the feed chain 53, which guide 54 is under spring tension and cooperates with the feed chain 53 and assures a safe feeding of the plants cut off by the cutting blade 58 to the feed rollers 47, 48. In this manner, the construction of the invention requires only one single feed chain 53.

An upwardly extending guide 57 is provided on the top of the cutting mechanism 60 in front of the cutting blade 58. The plants which are cut off by the cutting blade 58 are engaged by said guide 57 and are tilted forwardly so that they are assured of extending their cut ends first into the chaff chopper apparatus. The guide 57 can in a presently known manner be adjusted in its position.

According to FIGS. 11 and 12, a support arm consisting of a hollow member 93 is secured pivotably to the lower lift rods 3 of the tractor 1 which is illustrated by its right rear wheel and rear wheel axis. An implement, here a cutting mechanism 60 for crops grown in rows and a drum chopping or stalk chopper 94 is connected laterally alongside of the rear wheel to the tractor 1 with the help of the support arm 93. The discharge conduit of the drum chopper is identified at 85 and is illustrated only in FIG. 12. A support wheel 86 is arranged approximately in the center of gravity S of the implement, which support wheel 86 is supported on an arm 90 of a toggle lever which latter consists further of a pivot pin 88 and an arm 89 on the support arm 93. A coil spring 87 is hingedly connected to the arm 89, which coil spring, as illustrated in FIG. 12, is supported at 92 on the frame 92' of the implement and responds to pressure in an axial direction. The arms 89 and 90 are arranged with respect to one another at an acute angle. The coil spring 87 and the arm 89 are arranged according to the invention in such a manner that both define at the point of engagement c in the pivot position a (solid lines) an angle α of approximately 30° and in the pivot position b (dash-dotted lines) an angle β of approximately 90°. Of course, the spring 87 can also be associated with a two-way acting shock absorber. At a variable prestress of the spring 87 in the two pivot positions a and b, thus in the simplest manner, the moment of the lever arm 89 and spring 87 on the pin 88 is adjusted.

The embodiments of the invention in which an exclusive property or privilege is claimed are defined as follows:

1. Harvesting apparatus working laterally of an agricultural vehicle having a three-point linkage arrangement thereon, said harvesting arrangement being connectible through a frame for leaving the vehicle free for connection of a wagon to the vehicle three-point linkage, said harvesting apparatus comprising:

a receiving device for chaff goods, a press device, and a chaff chopping device, said chaff chopping device and said press device being connected after said receiving device;

means for suporting said press device for pivotal movement relative to said chaff chopping device;

first drive means for driving said receiving device and said chopping device, said drive means being arranged in a closed oil-filled housing; and second drive means for driving said press device, said second drive means being positioned in a separate housing, said separate housing and said second drive means being capable of movement with respect to the chaff chopping device.

2. Apparatus according to claim 1, wherein said press device is an upper feed roller; and wherein the pivot point around which the upper feed roller is guided is positioned on the opposite side of the chaff chopping device from the feed roller.

3. Apparatus according to claim 2, wherein the line connecting the pivot point to the feed roller passes through the axis of the chaff chopping device at the central position of its movement.

4. Apparatus according to claim 1, including a drive shaft for driving the apparatus, sadi drive shaft extending at an angle greater than 60 degrees to the vehicle power takeoff shaft; and
including at least one wide angle joint permitting said drive shaft to be driven by said vehicle power takeoff shaft.

5. Apparatus according to claim 4, wherein the drive shaft of the apparatus extends at an angle of approximately 90 degrees to the vehicle power takeoff shaft; and
wherein two angle joints are provided between the power takeoff shaft and said drive shaft.

6. Apparatus according to claim 4, including a removable gearing on the vehicle power takeoff shaft, said removable gearing being constructed as a bevel gearing with two driven shafts, one of said driven shafts extending inclined to the vehicle; and
wherein said harvesting apparatus is driven by means of a drive shaft having at least one wide angle joint therein connecting same to the inclined drive shaft.

7. Apparatus according to claim 6, wherein the bevel gearing is adjustable and flexible around the axis of the power takeoff shaft.

References Cited
UNITED STATES PATENTS

| | | | |
|---|---|---|---|
| 2,536,899 | 1/1951 | Andrews et al. | 56—18 |
| 2,849,850 | 9/1958 | O'Donnell et al. | 56—15 |
| 3,021,658 | 2/1962 | Mitchell | 56—15 |
| 3,229,451 | 1/1966 | Wenzel et al. | 56—10 |
| 3,456,429 | 7/1969 | Sexton, Jr. | 56—16 |

RUSSELL R. KINSEY, Primary Examiner

U.S. Cl. X.R.

56—504

UNITED STATES PATENT OFFICE
CERTIFICATE OF CORRECTION

Patent No. 3 619 995  Dated November 16, 1971

Inventor(s) Alfred Eggenmuller, Lorenz Scherer, Heinrich Bellan and Rudolf Wohrle It is certified that error appears in the above-identified patent and that said Letters Patent are hereby corrected as shown below:

Claim 4, line 2; "sadi" should be ---said---.

Claim 7, line 2; "flexible" should be ---fixable---.

Signed and sealed this 2nd day of May 1972.

(SEAL)
Attest:

EDWARD M. FLETCHER, JR.  ROBERT GOTTSCHALK
Attesting Officer  Commissioner of Patents